Aug. 5, 1924.

L. F. OTTEN

BUCKLE

Filed Aug. 8, 1922   2 Sheets-Sheet 1

1,503,801

INVENTOR
LAWRENCE F. OTTEN
BY James N. Ramsey
ATTORNEY

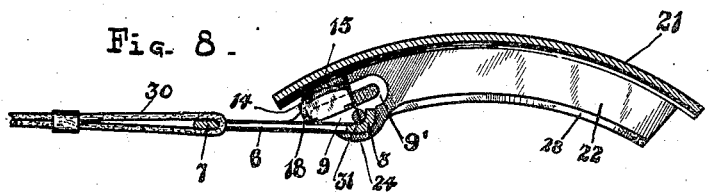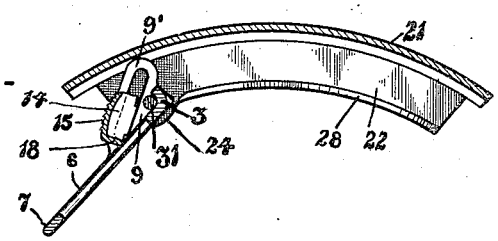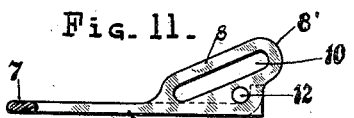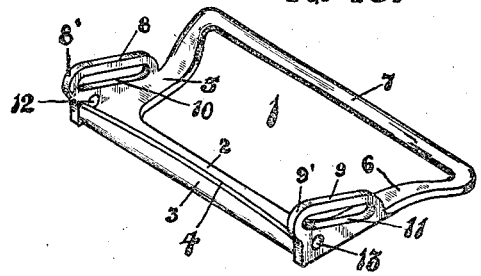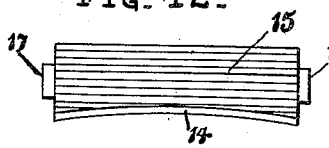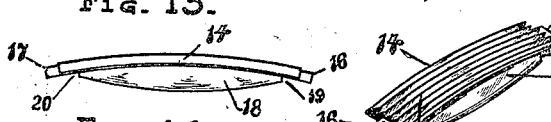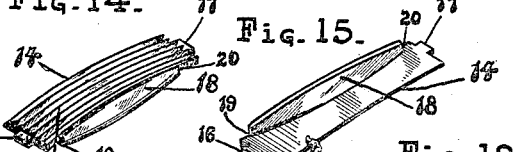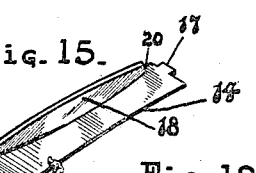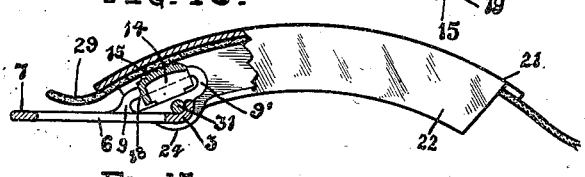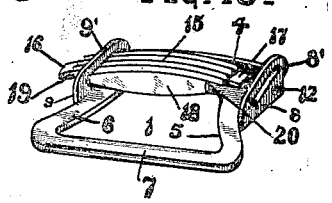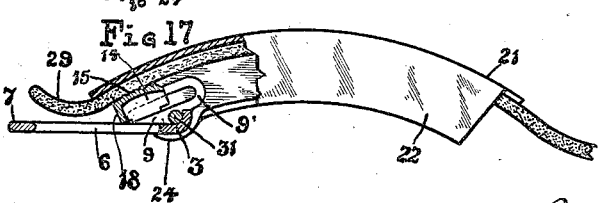

Patented Aug. 5, 1924.

1,503,801

UNITED STATES PATENT OFFICE.

LAWRENCE F. OTTEN, OF NEWPORT, KENTUCKY, ASSIGNOR TO THE L. F. OTTEN MANUFACTURING COMPANY, OF CINCINNATI, OHIO, A CORPORATION OF OHIO.

BUCKLE.

Application filed August 8, 1922. Serial No. 580,495.

*To all whom it may concern:*

Be it known that I, LAWRENCE F. OTTEN, a citizen of the United States, residing at Newport, in the county of Campbell and State of Kentucky, have invented certain new and useful Improvements in Buckles, of which the following is a specification.

My invention relates to improvements in buckles and more particularly to those used upon belts for personal wear.

The objects of my invention are to provide a simple, efficient, strong, durable, compact and economical buckle which is adapted to be easily and conveniently attached to or detached from the free end of a belt for personal wear; also to provide such a buckle which is adapted to securely grasp and hold the belt upon the wearer at any point without the necessity of weakening the belt by perforations to receive the ordinary tongue of the buckle and without subjecting the belt to damage by its engagement with the gripping means, as well as to provide such a belt buckle having a minimum of parts.

Another object of my invention is to provide a belt buckle that is readily adapted to be released from the free end of the belt with a minimum of outward movement from the wearer, and, at the same time, to make the releasing action positive so as to insure the release of the belt, when desired.

Another object of my invention is to provide simple and efficient means to adapt the buckle to positively, firmly and securely grip belts of varying thicknesses. My invention possesses other objects and advantages as set forth.

My invention consists in the parts and in the construction, combination and arrangement of parts as herein set forth and claimed.

In the drawings:

Fig. 8 is a central longitudinal section of a buckle and the attached end of a belt;

Fig 9 is a similar view showing my improvement adjusted to open position to receive the free end of a belt;

Fig. 10 is a perspective view of the loop lever;

Fig. 11 is a side view thereof;

Fig. 12 is a plan view of the slidable grip;

Fig. 13 is an edge view thereof;

Fig. 14 is a top perspective view thereof;

Fig. 15 is a bottom perspective view thereof;

Fig. 16 is a side elevation partly broken away showing my gripping means in holding position upon the free end of a thin belt;

Fig. 17 is a similar view showing it in holding position upon the free end of a thick belt;

Fig. 18 is a perspective view of the loop lever and grip showing the method of assembling said parts.

Figure 1:
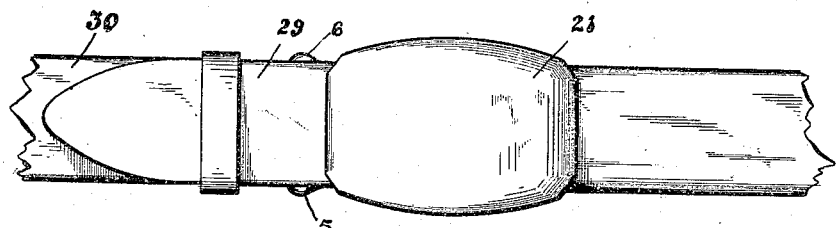
Fig. 1 is a front view of a buckle, having curved sides, embodying my invention, in position upon a belt.

In the embodiment of my invention as illustrated and which shows a preferred construction I provide a loop lever 1 comprising connecting bar 2 having upturned supporting and strengthening flange 3, preferably having a convex edge 4, said connecting bar having lever arms 5 and 6 connected thereto at their inner ends respectively and connected at their outer ends respectively to belt attaching bar 7. Ears 8 and 9 are formed upon lever arms 5 and 6 respectively and the ends of connecting bar 2 and said ears taper from their outer ends inwardly toward belt attaching bar 7. Each ear is provided with a slot 10 and 11 respectively, said slots inclining downwardly toward the center of said loop lever. Said ears are provided with pivot bearings 12 and 13 respectively, located between the outer ends of said slots respectively and the respective ends of connecting bar 2.

I also provide a grip 14 having gripping surface 15 preferably comprising undercut or outwardly projecting ribs or teeth. Said grip is provided at each end with flattened engaging lugs 16 and 17 of less width than the grip whereby it is adapted to be slidably mounted in said slots, as clearly shown in Figs. 4 and 6. Said grip preferably has a lateral or downturned convex strengthening flange 18 along its rear edge between its ends leaving spaces 19 and 20 to provide clearance for lever arms 5 and 6 respectively to permit lugs 16 and 17 to be adjusted to the inner end of slot as shown in Fig. 17, where the maximum of space is obtained, as when clamping it upon a thick belt, and also to provide clearance to permit the insertion of said grip into its adjacent slot 10 or 11, as the case may be, when mounting said grip into slidable operative position upon the loop lever, as shown in Fig. 18. The gripping surface in the form shown in convex to conform to the curved inner wall of the face plate 21 here illustrated, but said surface may be changed to correspond to any other shape of body that may be used, as for instance, if the face plate is straight or flat the surface of the grip will also be straight or flat with suitable gripping means thereon such as the illustrated ribs or teeth. The type of buckle body to which my improvement is attached is provided with side flanges 22 having extensions 23 and 24 provided with pivot bearings 25 and 26 respectively and having inturned flanges 27 and 28 forming a channel through which the free end 29 of belt 30 is inserted, but other belt retaining means may be used in place of said inturned flanges.

Figure 4:
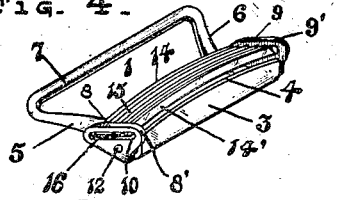
Fig. 4 is a perspective view of my novel means for gripping the free end of a belt and to which the other end of the belt is attached.
Figure 5:
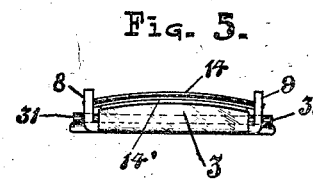
Fig. 5 is a rear edge view of Fig. 4 showing the pivot pin.
Figures 6, 7:
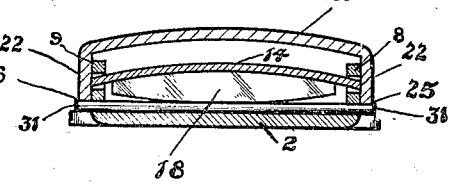
Fig. 6 is a plan view of Fig. 4.
Fig. 7 is a cross section on the line 7—7 of Fig. 2.
Figure 19:
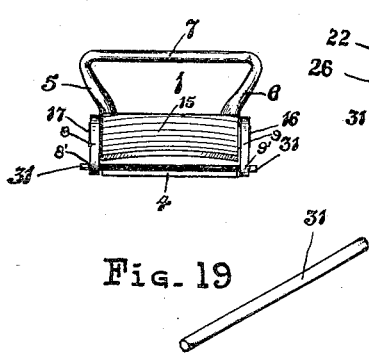
Fig. 19 is a perspective view of the pivot pin.

Supporting and strengthening flange 3 of loop lever 1 is adapted to lie in a plane slightly below the front edge 14' of grip 14 and to support said grip when subjected to excessive pressure whereby said grip is prevented from being distorted in shape by wedging the belt against the inner side of the face plate and the upper side of the grip. Said parts as thus constructed are assembled by inserting either slightly reduced end of the grip into its adjacent slot as clearly shown in Fig. 18 and then inserting the lug of the other end thereof into proper position in its adjacent slot, thereby bringing both lugs into proper operative position in its slot as shown in Fig. 4. The parts thus assembled are placed between the side flanges 22 with the loop lever pivot bearings 12 and 13 in registry with bearings 25 and 26 respectively whereupon pivot pin 31 is inserted through said bearings and is preferably riveted to said side flanges as shown in Fig. 7. When thus assembled the side flanges serve to hold lugs 16 and 17 in operative engagement in slots 10 and 11 respectively.

Figure 2:
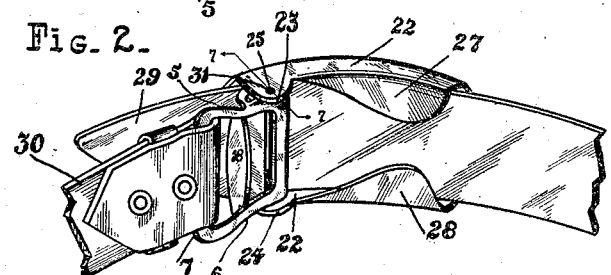
Fig. 2 is a perspective rear view of the same in position to be adjusted to tightly grip the free end of a belt.
Figure 3:
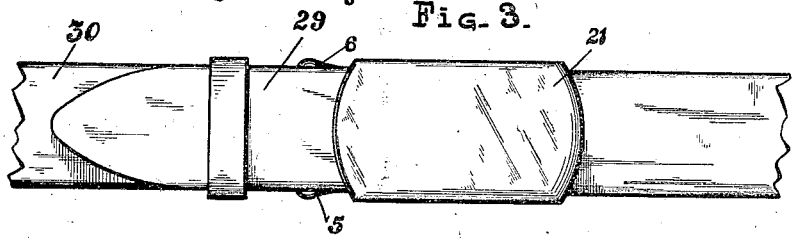
Fig. 3 is a face view of a buckle having straight sides, embodying my invention, and showing it in position upon a belt.

The position of the buckle for inserting the free end of a belt is shown in Fig. 9. The free end of the belt is inserted between the face plate and grip as illustrated in Fig. 2 and when the gripping surface comes into contact with the inner surface of the free end of the belt it draws the grip upwardly in the slots into wedging engagement with the belt thereby securely holding it until it is released by the wearer.

By slidably mounting the grip upon the loop lever in the manner set forth the buckle is adapted to receive and grip the free end of belts of varying thicknesses. When a thin belt is inserted the grip will slide upwardly in the slots until the gripping surface comes into wedging engagement with the belt as shown in Fig. 16. When a thicker belt is inserted the grip will come into wedging engagement at or near the lower end of the slot depending upon the thickness of the belt and in any case the grip will move relative to the slots and form a wedging gripping engagement upon the belt thus accommodating itself to any thickness of belt used in connection with this class of buckle. By mounting the grip in the inclined slots the full area of the gripping surface will always engage the lower surface of the free end of the belt and thereby secure a more perfect holding grip and at the same time prevent any cutting or marring of the belt by the edge of the grip impinging therein. The ordinary tension of the belt upon the wearer to insure gripping holding engagement will not be sufficient to cause the teeth of the grip to cut or mar the surface of the belt, the function of said teeth being merely to move the grip into wedging holding engagement on the belt.

The projecting ends of the ears 8' and 9' serve as guides between which the belt is received for insertion between the grip and buckle body and serve to center the belt relative to the buckle.

The flattened lugs serve to prevent any pivotal movement of the grip relative to the lever and provides a wide strong bearing which will resist wear longer than otherwise.

The pivot pin being riveted in the pivot bearings 25 and 26 there is no wear upon said bearings. The attached end of the belt may be secured to the loop lever in any suitable manner such as snap buttons shown in Fig. 2. When thus connected to the loop and the parts assembled as shown in Fig. 2 the wearer simply adjusts the parts as there shown and inserts the free end 29 in the channel beneath the inturned flanges, and between the extensions of the ears, respectively, and between grip 14 and the inner surface of face plate 21 until the belt is sufficiently tight, whereupon the parts will assume their proper holding position. The pressure of the belt on the loop attaching end of the lever when drawing the free end of the belt to position brings said lever nearer to the free end of the belt thereby causing the belt and buckle to assume a very compact position on the wearer.

While I have shown and described my novel buckle as adapted and intended for use on belts for personal wear it may also be used in any other situation to which it is adapted and while I have shown and described particular constructions and styles of belt buckles having my novel operating parts mounted thereon it will be understood that it is adapted to be applied to varying styles and shapes of buckles and that the parts comprising my invention may also be varied in construction and arrangement without departing from the scope or spirit thereof as defined in the claims.

What I claim as new and desire to secure by Letters Patent is:

1. In a belt buckle for personal wear, a buckle body, a belt attaching lever pivotally mounted thereon and a grip mounted on said belt attaching lever and adapted to slide longitudinally relative to said lever and to the buckle body whereby a wedging holding grip on the free end of the belt is automatically obtained.

2. In a belt buckle for personal wear, a buckle body having side flanges between which the belt is adapted to be received and having bearings, a pivot pin extending through said bearings and riveted therein, a belt attaching lever pivotally mounted at one end thereof on said pin between said flanges, ears on said lever adjacent its pivot bearings and each ear having a slot therein extending longitudinally of said lever and a grip mounted in said slots on said lever whereby it is adapted to slide longitudinally therein to adapt itself to belts of varying thicknesses.

3. In a belt buckle for personal wear, a belt attaching lever having pivot bearings and having slidable bearings formed at an inwardly extending angle from its belt attaching end toward the center of the buckle body when in belt clamping position and spaced apart from said pivot bearings, and a grip slidably mounted in said slidable bearings and forming wedging engagement with belts of varying thicknesses.

4. In a belt buckle for personal wear, a belt attaching lever adapted to be pivotally mounted and having ears each provided with a slot, a grip having a reduced end adapted to be inserted into its adjacent slot when assembling said parts and having a lug on said reduced end of less width than said reduced end to permit said grip to be detachably mounted.

5. In a belt buckle for personal wear, a body, a belt attaching lever pivoted thereto, said lever having ears each provided with a slot and having an upturned supporting flange on its pivoted end whose edge corresponds in shape to the lower surface of the grip and having its edge adjacent the pivot adapted to engage said supporting flange when excessive pressure is applied thereto whereby said grip is prevented from being distorted in shape while wedging the belt against the inner side of the buckle body and the upper side of the grip.

6. In a belt buckle for personal wear, a body, a belt attaching lever pivoted thereto, said lever having ears each provided with a slot and having an upturned convex supporting flange on its pivoted end, and a concavo-convex grip slidably mounted in said slots.

LAWRENCE F. OTTEN.